May 26, 1931.   A. N. CRAMER   1,806,743
SHEAR MECHANISM FOR GLASS FEEDERS
Filed Nov. 30, 1927   3 Sheets-Sheet 1
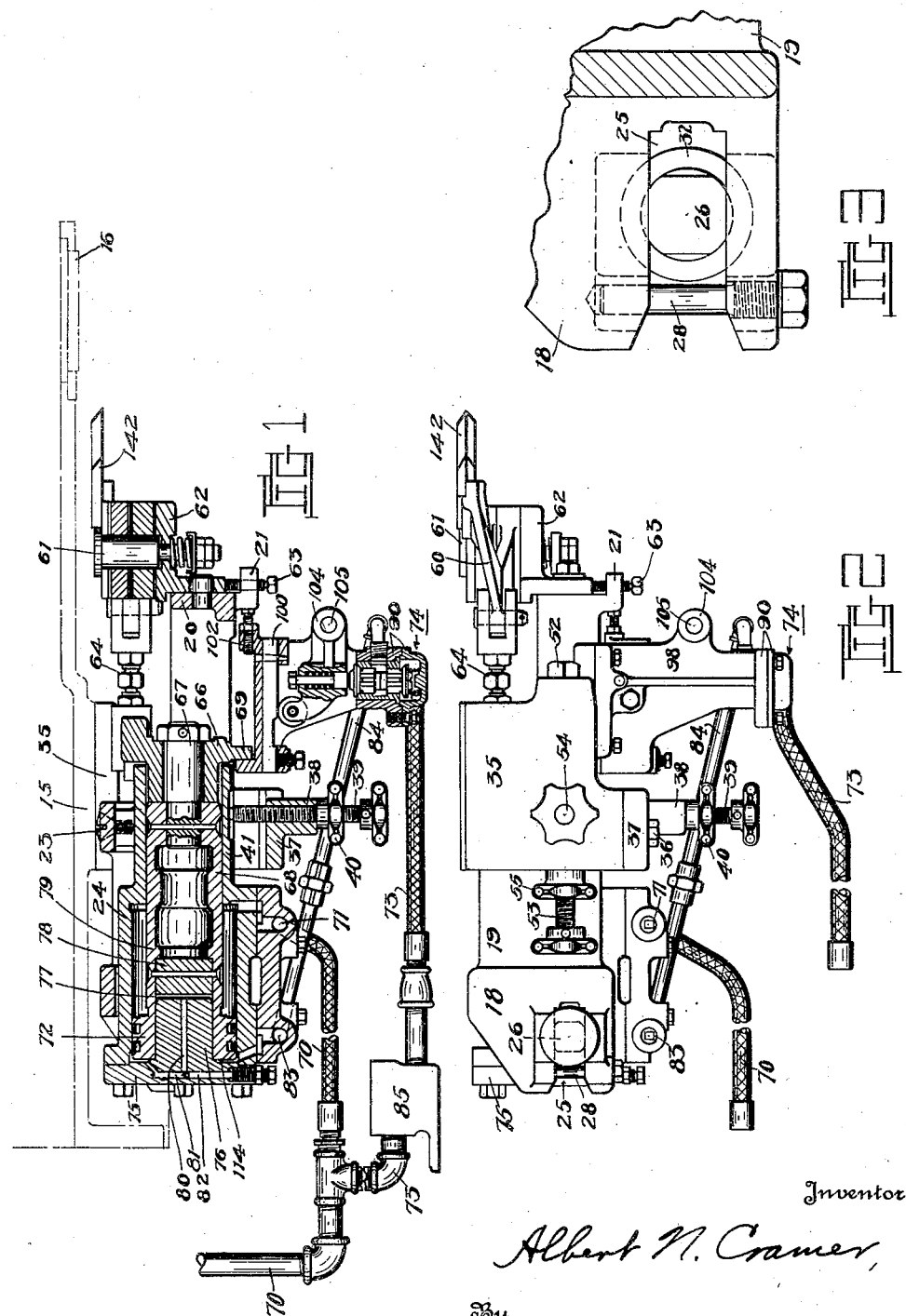

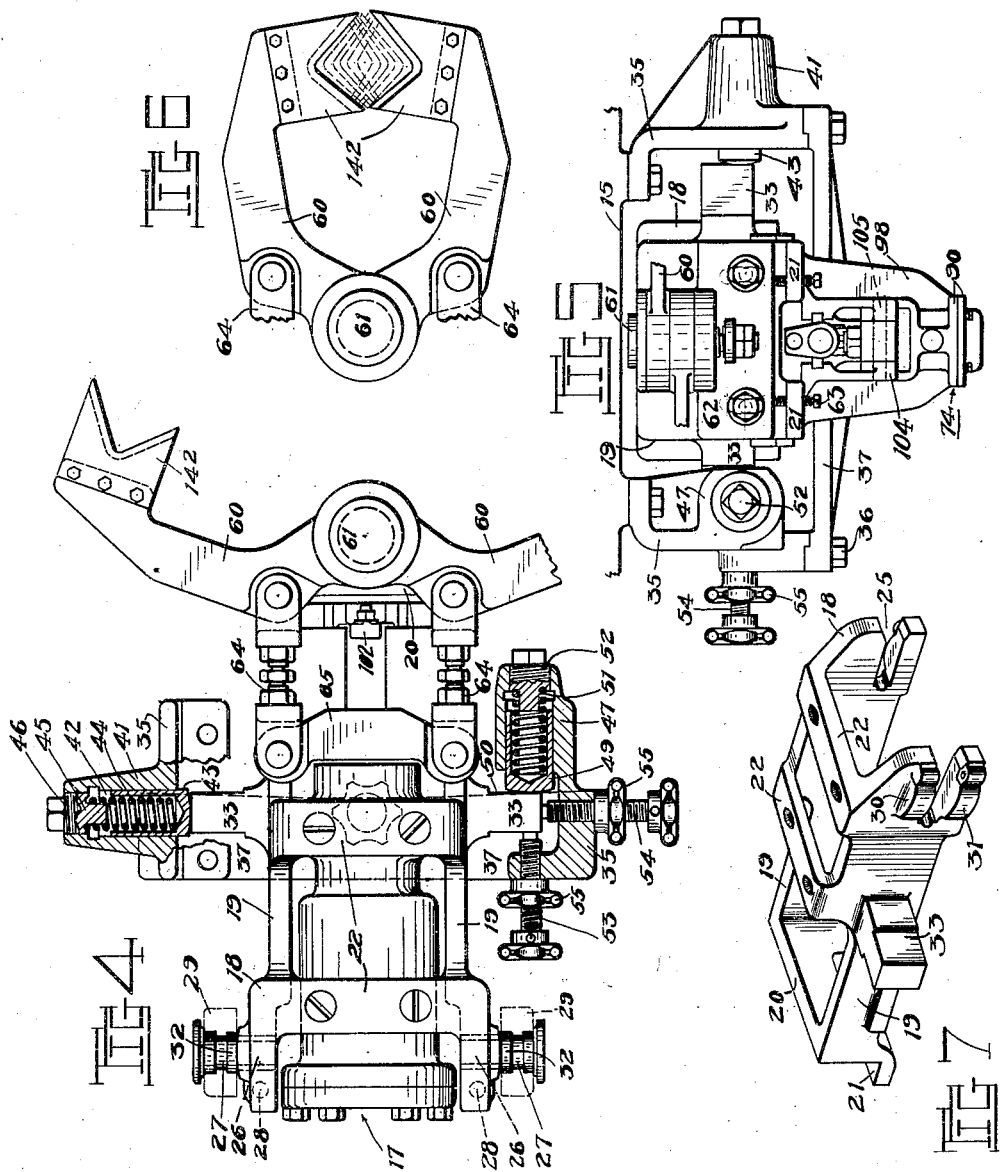

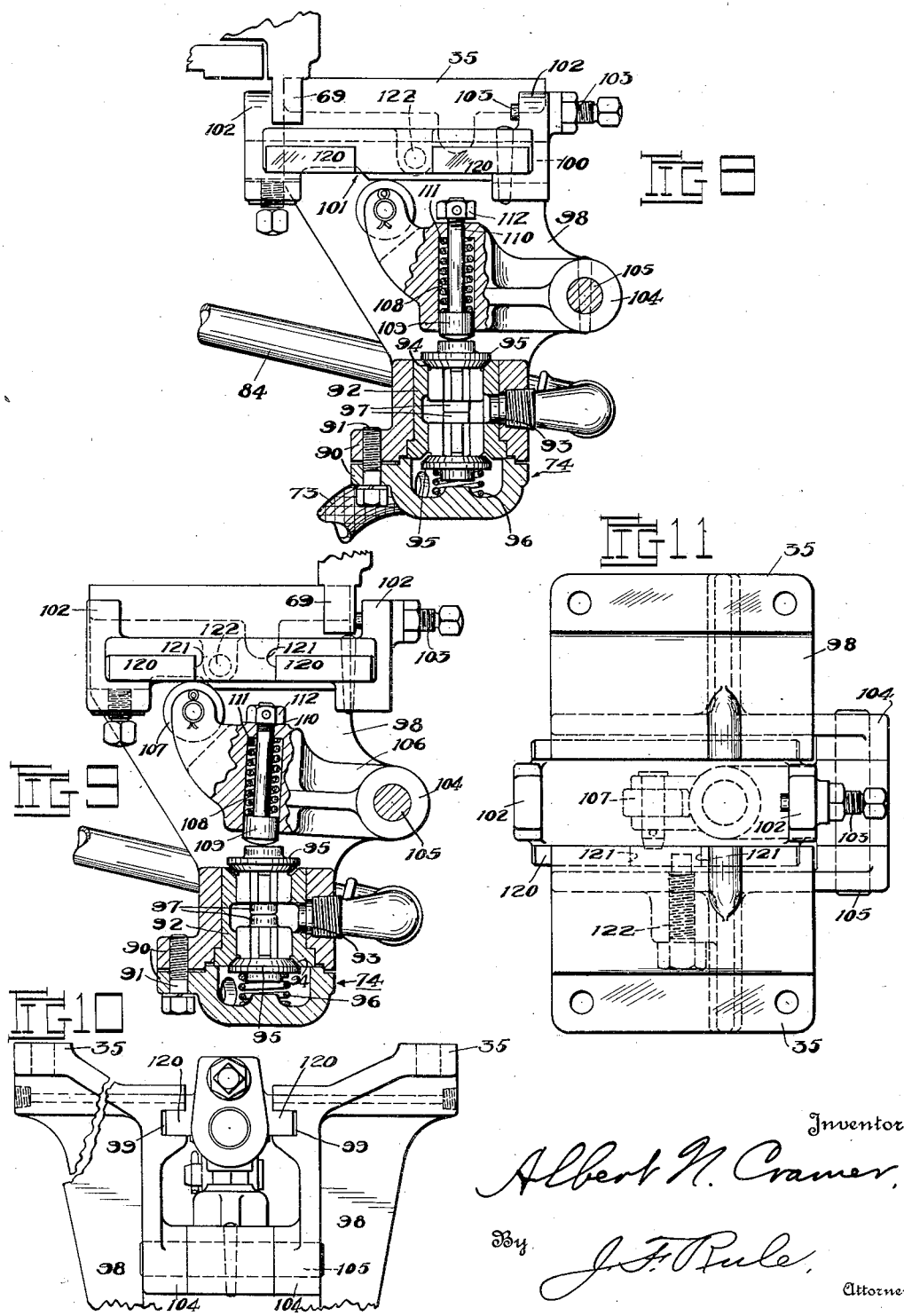

Patented May 26, 1931

1,806,743

UNITED STATES PATENT OFFICE

ALBERT N. CRAMER, OF TOLEDO, OHIO, ASSIGNOR TO OWENS-ILLINOIS GLASS COMPANY, OF TOLEDO, OHIO, A CORPORATION OF OHIO

SHEAR MECHANISM FOR GLASS FEEDERS

Application filed November 30, 1927. Serial No. 236,653.

The present invention relates to improvements in shear mechanism for glass feeders, having for an object the provision of generally improved means manually adjustable without interference with operation of the feeder, to change the relation between the shears and bottom outlet orifice from which formed charges of glass are periodically suspended.

A further object is to provide improved means to reverse the shear mechanism, such reversing means being adjustable to initiate outward movement of the shears away from each other at any desired point. To this end, the mechanism comprises a reciprocable piston connected through links to a pair of shears, said piston operating the reversing mechanism at one end of its stroke and thereby causing the piston to reverse its direction of travel and separate the shears. An important feature consists in the adjustability of the reversing mechanism by which the length of the piston stroke may be varied and thereby change the degree to which the shear blades overlap during the cutting operation.

It is likewise an object to provide a novel and simple mounting for shear mechanism and generally simplify construction thereof.

Other objects will be apparent hereinafter.

In the accompanying drawings:

Fig. 1 is a vertical central sectional view of the shear mechanism.

Fig. 2 is a side elevation thereof.

Fig. 3 is a detail view showing the hinge connection between the motor frame and supporting bearings.

Fig. 4 is a plan view with parts in section.

Fig. 5 is a front end elevation illustrating the means to adjust the air motor transversely.

Fig. 6 is a fragmentary detail showing the shear blades approaching the charge severing position.

Fig. 7 is a detail perspective view of the supporting frame for the air motor.

Fig. 8 is a detail sectional elevation showing the reversing valve and its operating devices in the position assumed prior to and during cutting movement of the shear blades.

Fig. 9 is a view similar to Fig. 8, showing the relation between the parts approximately at the time of reversing the piston movement.

Fig. 10 is a fragmentary front elevation of the reversing valve control device.

Fig. 11 is a plan view of the devices which actuate the reversing valve.

Referring to the drawings, the shear mechanism is shown below and supported from the casing 15 of a feeder boot (not shown), there being provided an outlet 16 through which glass issues and from the walls of which, formed charges of molten glass are periodically suspended and severed for delivery to molds of a forming machine (not shown).

The shear mechanism includes an air motor 17 which is supported in an open frame 18 or carrier (Figs. 4 and 7). This supporting frame comprises side members 19 (Fig. 7) connected together at one end by a cross bar 20, the latter formed with a forwardly extending flange or ledge 21 whose function will be apparent hereinafter. The rear portions of the side members 19 are increased in height, these portions being interconnected by a pair of longitudinally spaced cross bars 22 which are secured by screws 23 or the like fastening elements to the cylinder 24 of the air motor 17. The ends of the wide portions of the side bars 19 are formed with transversely aligned slots 25 in which the angular inner ends 26 of hinge pins 27 are slidably received and held by retaining pins 28 (Figs. 3 and 4). The hinge pins 27 are revolubly mounted in bearing blocks 29 suitably connected to the feeder boot casing 15.

Bosses 30 (Fig. 7) extend outwardly from the side members of the frame or carrier 18 above and below the slots 25 and have their outer faces 31 curved longitudinally for engagement with the inner faces of collars 32 carried by the hinge pins 27. Thus, the motor supporting frame is free to swing vertically in bearings 29 or laterally upon the end portions 26 of the hinge pins. Transversely aligned, laterally directed arms 33, substantially rectangular in cross section, are formed at the juncture of the wide and narrow portions of side members 19. The purpose of these arms will be apparent presently.

A stationary frame comprising a pair of brackets 35 (Fig. 5) is bolted or otherwise secured to the casing 15 and have their lower ends removably secured by bolts 36 or the like to a transverse connector bar 37. This bar 37 is formed with a depending boss 38 (Fig. 1) mounting an adjusting screw 39 carrying a lock nut 40. This adjusting screw engages the lower side of the air motor cylinder 41 and is operable to adjust the front end of the motor upwardly or downwardly about the common axis of the hinge pins 27 to change the elevation of the shears 142 relative to the bottom outlet orifice 16, as is apparent. The lock nut 40 is employed to hold the adjusting screw 39 against accidental rotation.

One of the brackets 35 is formed with an outwardly extending head 41 having an opening 42 therethrough in which is slidably arranged a cup-like bearing block 43, the inner end of which yieldingly and frictionally engages the adjacent end of one of the arms 33 on the motor carrying frame. A coil spring 44 is disposed in the opening 42 having one end engaged with the bearing block 43 and its other end encircling an extension 45 on a screw plug 46. This plug is adjustable to vary the tension of the spring 44, and accordingly increase or decrease the friction between the bearing block 43, and the end of the arm 33.

The bracket 35, opposite the one above referred to, is formed with a head 47 extending forwardly therefrom and longitudinally of the frame, said head mounting a bearing block 49 yieldingly and frictionally engaging the vertical front face 50 of the arm 33. A coil spring 51, whose tension is variable by adjustment of a screw plug 52, maintains frictional engagement between the bearing block 43 and the arm 33. An adjusting screw 53 is mounted in the bracket 35 in axial alignment with the bearing block 49 and spring 51 so that it bears against the rear vertical face of the arm 33, insuring application of sufficient pressure to support the arm and consequently the front end of the motor carrying frame at the proper elevation. An adjusting screw 54 is threaded transversely through the last named bracket 35 and engages the outer end of the adjacent arm 33. These adjusting screws 53 and 54 are equipped with locking nuts 55 which hold said screws at any desired adjustment. It is seen that by adjusting the transverse screw 54 (Fig. 4), the motor carrying frame may be shifted to change the relation between the shear blades 142 and the outlet opening 16. Adjustment of the longitudinal screw 53 (Fig. 4) will operate to move the motor and its carrying frame, together with the shear blades 142, longitudinally relative to the feeder boot. Thus, the shear blades may be accurately adjusted relative to the bottom outlet 16.

The shear blades 142 are removably secured to shear arms 60 mounted on a vertical hinge pin 61 which is carried by an adjustable bracket 62 mounted for vertical swinging movement on the cross bar 20 of the motor carrying frame. Adjusting screws 63 carried by the ledge or flange 21 on the cross bar 20, are operable to raise or lower one end or the other of the bracket 62 and thereby change the cutting angle of the shear blades 142. Adjustable links 64 (Fig. 4) interconnect intermediate portions of the shear arms 60 and the ends of a cross head 65 having a collar 66 fixed to the lower side thereof and secured to a pin 67 extending axially of and fixed to the outer end of a sleeve 79 on a differential piston 68. This collar 66 is formed with a depending finger 69 whose function will be apparent presently.

The cylinder head 75 on the inner end of the cylinder 24 is formed with an inward extension 76 which projects into an axial opening 77 formed in the piston 72. A block 78 secured within the forwardly extending sleeve 79 on the piston 72, forms the inner end wall of the opening or recess 77 into which the extension or plug 76 projects. An opening 80 extends axially through the extension 76, communicating at its outer end with a radial passageway 81 formed in the cylinder head 75 and leading to the interior of the cylinder at the outer end thereof. An adjustable needle valve 82 (Fig. 1) regulates and varies the size of the opening which provides communication between the axial and radial passageways 80 and 81.

The port 71 substantially at the center of the cylinder 24, admits constant air pressure from a supply pipe 70 to the front side of the piston 72. A port 83 connected to a variable air pressure supply pipe 84, permits periodic application of air pressure to the other side of the piston 72 whereby the piston is moved forwardly at proper intervals, bringing the shear blades together to sever charges of glass from a stream issuing through the outlet 16. A valve 74 is fixed to the outer end of the pipe 84, the latter also being connected to a pipe 73 in which a timer valve 85 is arranged. This timer valve is indirectly operated by the ware forming machine (not shown) and controls the passage of air pressure to the valve 74 in timed relation to mold movements.

This valve 74 (Figs. 8 and 9) comprises in the illustrated embodiment, a two part housing 90 secured together by bolts 91 and carrying an internal sleeve 92 having a radial port 93 which provides communication between the interior of the valve and the air pressure pipe 84. The sleeve 92 is formed with valve seats 94 at its opposite ends.

Valve disks 95 are adapted for alternate engagement with the seats 94, the lower disk 95 resting upon a coil spring 96 which tends to seat said valve and thereby cut off flow of air pressure through the valve 74 and pipe 84 to the outer end of the piston 72. The valve disks 95 carry inwardly axially extending stems which at all times are in contact with each other, thereby insuring seating of one disk at a time for a purpose apparent hereinafter. This valve 74 is suspended from the front end of the motor carrying frame by a pair of transversely spaced arms 98 (Figs. 8 and 10). These arms 98 are provided with a pair of opposed longitudinal guideways 99 (Fig. 10) on their inner faces, in which a reciprocable cam bar 100 is longitudinally slidable. This cam is formed on its lower side with an offset 101 near its inner end for a purpose which will be described presently. The opposite ends of the cam bar 100 are connected to upwardly extending lugs 102 which limit free longitudinal movement of the finger 69 over the bar, said finger being carried by and at the front end of the piston 79. One of the ribs 120 (Fig. 9) on the cam bar 100 is partially cut away to form a pair of spaced stops 121 which cooperate with a screw 122 on one of the arms 98 in preventing accidental longitudinal displacement of the bar 100. The front lug 102 mounts an adjustable stop screw 103 by which the point at which the finger 69 actuates the cam 100 may be varied.

A pair of opposed bearings 104 formed on the depending arms 98 just above the valve 74, carry a hinge pin 105 on which a rock arm 106 is mounted. The outer end of this rock arm 106 extends upwardly and carries a cam roll 107, which is at all times engaged with the lower face of the cam 100. This rock arm is formed with an enlarged central portion having a downwardly opening recess 108 in which a plunger 109 is arranged, said plunger being formed with a stem 110 extending upwardly through the opening 108 and beyond the upper side of the rock arm 106. A coil spring 111 encircles the stem 110 and operates to yieldingly hold the plunger 109 in its lowermost position. An adjusting nut 112 is employed to control the spring tension.

In describing the operation of this shear mechanism, it is assumed that the timer valve 85 is being operated by the forming machine and that the glass is being suspended in formed charges from the walls of the outlet 16 at regular intervals. Constant air pressure holds the piston 72 in its outermost position as shown in Figs. 1 and 4 during portions of the intervals between actual severing operations. When the piston 72 is at the inner end of its stroke, the cam 100 is also at the inner end of its path as shown in Figs. 1 and 8, with the result that the rock arm 106 is in its lowermost position and the lower valve disk 95 is unseated. With operation of the timer valve 85, air pressure is supplied through the pipe 73, valve 74 and pipe 84 to the outer side of the piston 72. This air pressure also passes through the radial and axial passageways 81 and 80 in the cylinder head 75 and extension 76, respectively, to the outer face of the block 78. The piston 72 is initially given a slow forward movement in the cylinder 24. This slow initial movement is due to the fact that the area to which the variable air pressure is first applied, is only slightly greater than that to which the constant air pressure is applied. This point is apparent by reference to Fig. 1, wherein it will be seen that after the piston 72 has moved away from the cylinder head 75 a short distance, additional surface 114 of the piston 72 is exposed, thereby permitting rapid forward movement of the piston following slow initial movement. As the piston is completing its forward movement, the cam 100 is moved forwardly by engagement between the depending finger 69 and the stop screw 103, thereby positioning the rocker arm 106 as shown in Fig. 9. This positioning of the rocker arm allows the spring 96 to move the valve disks 95 upwardly, seating the lower disk to shut off the variable air pressure, and unseating the upper disk so that the air between the piston 72 and cylinder head 75 may return through the pipe 84 and escape through the valve 74 to the atmosphere.

Due to the size of the axial and radial passageways 80 and 81 in the cylinder head 75 and extension 76, exhaust of air pressure from the space between the extension 76 and the filler block 78 is comparatively slow. The needle valve 82 (Fig. 1) as previously indicated, is adjustable to further regulate the rate at which air pressure is exhausted from the space between the extension 76 and block 78 so that the cushioning effect of the air pressure therein on the return of the piston 72, may be controlled. By adjusting the stop screw 103 (Figs. 8 and 9), the point at which the piston movement is reversed may be varied as required by particular operating conditions. Thus, the degree of overlap of the shear blades 142 may be readily controlled. In view of the above, it is evident that the present invention provides means whereby the shear mechanism may be readily adjusted to meet various operating conditions without interruption to operation of the feeder or machine with which it is being used.

Modifications may be resorted to within the spirit and scope of the appended claims.

What I claim is:

1. Shear mechanism comprising an elongated open frame, shears mounted on one end of the frame, an air motor arranged on the frame and operatively connected to the shears, a reciprocating differential piston included in the air motor, means for constantly applying air under pressure to one side of the piston, means including a valve for supplying air under pressure to the opposite side of the piston periodically, means actuated by movement of the piston in one direction to open the valve, said valve opening means including a pivoted valve actuating rocker arm, a cam movable in the direction of the length of the piston for controlling operation of the arm, and means whereby movement of the piston actuates said cam.

2. A shear mechanism including a supporting frame, an air motor thereon having a reciprocating differential piston therein, a sleeve on the piston extending forwardly through one end of the motor cylinder, shears mounted on one end of the frame, adjustable connection between the shears and the sleeve carried by the piston, means to constantly apply air pressure to one side of the piston, means including a reversing valve for periodically applying air pressure to the opposite side of the piston, and automatic means directly controlled by reciprocation of the piston to reverse said air pressure control valve at regular intervals.

3. A shear mechanism including a supporting frame, an air motor thereon having a reciprocating differential piston therein, a sleeve on the piston extending forwardly through one end of the motor cylinder, shears mounted on one end of the frame, adjustable connection between the shears and the sleeve carried by the piston, means to constantly apply air pressure to one side of the piston, means including a reversing valve for periodically applying air pressure to the opposite side of the piston, automatic means directly controlled by reciprocation of the piston to reverse said air pressure control valve at regular intervals, said automatic means including a cam controlled rocker arm periodically actuating the reversing valve, and means carried by the sleeve extension on the motor piston to actuate the cam.

4. A shear mechanism comprising an air motor having a reciprocating piston therein, the latter formed with a sleeve extending through one end of the motor cylinder, shears operatively connected to said sleeve extension, means to constantly apply air pressure to one side of the piston, means including a reversing valve to periodically apply air pressure to the opposite side of the piston, automatic means controlled by movement of the piston to reverse said valve and thereby reciprocate said piston, said valve including means to periodically exhaust air pressure to the atmosphere from said other side of the piston, and means to retard exhaust of air pressure to thereby cushion the movement of the piston in one direction.

5. A shear mechanism comprising an air motor having a reciprocating piston therein, the latter formed with a sleeve extending through one end of the motor cylinder, shears operatively connected to said sleeve extension, means to constantly apply air pressure to one side of the piston, means including a reversing valve to periodically apply air pressure to the opposite side of the piston, automatic means controlled by movement of the piston to reverse said valve and thereby reciprocate said piston, said valve including means to periodically exhaust air pressure to the atmosphere from said other side of the piston, means to retard exhaust of air pressure to thereby cushion the movement of the piston in one direction, said control means including the formation of an axially extending recess in said other side of the piston, an extension carried by the cylinder head and projecting into said recess, said extension formed with a relatively small passageway providing communication between said recess and the means for periodically supplying air pressure, and a valve adjustable to control the rate of flow of air pressure through said passageway.

6. A shear mechanism including a shear operating air motor, said motor comprising a cylinder having an open end, a cylinder head at the other end thereof formed with an axial inwardly projecting extension, said extension and head having interconnected axial and radial passageways opening at their outer ends within the cylinder, a differential piston formed with a chamber to receive said extension, means to constantly apply air pressure to the inner face of the piston, means to periodically apply air pressure through said passageways to said chamber and to the outer face of the piston whereby the piston is periodically moved away from said head, and means to exhaust air pressure from said chamber and other side of the piston to the atmosphere whereby the latter is moved axially toward the cylinder head.

7. A shear mechanism including a shear operating air motor, said motor comprising a cylinder having an open end, a cylinder head at the other end thereof formed with an axial inwardly projecting extension, said extension and head having interconnected axial and radial passageways opening at their outer ends within the cylinder, a differential piston formed with a chamber to receive said extension, means to constantly apply air pressure to the inner face of the piston, means to periodically apply air pressure through said passageways to said chamber and to the outer face of the piston whereby the piston is periodically moved away from said head, means to exhaust air pressure from said chamber and other side of the piston to the atmosphere whereby the latter is moved axially toward the cylinder head, and means to control the rate of exhaust of air pressure to the atmosphere.

8. A shear mechanism including a shear operating motor having a reciprocable differential piston therein, shears operatively connected to the piston, means to alternately apply air under pressure to opposite sides of the piston to reciprocate the latter, said means including a reversing valve regulating the application of air under pressure to one side of the piston, a movable cam, means interposed between the cam and valve whereby reciprocating movement of said cam alternately opens and closes the valve, and means movable with the piston to reciprocate said cam and thereby alternately open and close the valve.

9. A shear mechanism including a shear operating motor having a reciprocable differential piston therein, an extension on the piston movable through one end of the motor cylinder, shears operatively connected to said extension, means to apply air pressure to opposite sides of the piston to reciprocate the latter, said last named means including a cam controlled reversing valve regulating the application of air pressure to one side of the piston, a depending finger on said piston extension, means engaged by the finger at one end of the piston stroke to actuate the valve to thereby exhaust air pressure from one side of the piston to the atmosphere, means engaged by the finger at the other end of the piston stroke to actuate the reversing valve and thereby cause application of air pressure to one side of the piston, and means to adjust the valve control mechanism to thereby vary the stroke of the motor piston.

10. A shear mechanism including a shear operating motor having a reciprocable differential piston therein, shears operatively connected to the piston, means to alternately apply air under pressure to opposite sides of the piston to reciprocate the latter, said means including a reversing valve regulating the application of air under pressure to one side of the piston, a movable cam, means interposed between the cam and valve whereby reciprocating movement of said cam alternately opens and closes the valve, means movable with the piston to reciprocate said cam and thereby alternately open and close the valve, and an adjustable device on the cam for predetermining and varying the point at which the piston causes initial movement of the cam.

Signed at Toledo, in the county of Lucas and State of Ohio, this 26th day of November, 1927.

ALBERT N. CRAMER.